United States Patent
Meneghini et al.

(10) Patent No.: US 8,062,712 B2
(45) Date of Patent: Nov. 22, 2011

(54) AMALGAM DECOMPOSER FOR MERCURY CATHODE CELLS FOR ALKALI CHLORIDE ELECTROLYSIS

(75) Inventors: Giovanni Meneghini, Milan (IT); Raffaello Bertin, Vignole Borbera (IT)

(73) Assignee: Industrie De Nora S.p.A., Milan (IT)

( * ) Notice: Subject to any disclaimer, the term of this patent is extended or adjusted under 35 U.S.C. 154(b) by 497 days.

(21) Appl. No.: 12/249,396

(22) Filed: Oct. 10, 2008

(65) Prior Publication Data
US 2009/0038956 A1 Feb. 12, 2009

Related U.S. Application Data

(63) Continuation of application No. PCT/EP2007/053563, filed on Apr. 12, 2007.

(30) Foreign Application Priority Data

Apr. 12, 2006 (IT) .............................. MI2006A0731

(51) Int. Cl.
 *C23C 4/10* (2006.01)
 *B01J 8/02* (2006.01)
(52) U.S. Cl. ........ 427/450; 422/211; 422/256; 204/227; 204/249; 204/220; 204/278
(58) Field of Classification Search ................. 422/211, 422/256; 204/227, 249, 220, 278; 427/450
See application file for complete search history.

(56) References Cited

U.S. PATENT DOCUMENTS

| | | | | |
|---|---|---|---|---|
| 2,423,351 A | * | 7/1947 | Taylor | 204/219 |
| 3,122,594 A | * | 2/1964 | Kielback | 261/94 |
| 3,606,359 A | * | 9/1971 | McCormick | 428/564 |
| 3,875,039 A | * | 4/1975 | Matusek et al. | 204/248 |
| 3,981,490 A | * | 9/1976 | Rousar et al. | 266/169 |
| 4,161,433 A | | 7/1979 | De Nora et al. | |
| 5,262,133 A | | 11/1993 | Adams et al. | |

OTHER PUBLICATIONS

Database WPI Week 197522 Derwent Publications Ltd., London, GB; AN 1975-37088W. XP002458056 & SU 431 107 A (Antonov V N), Jan. 3, 1975. Abstract.
International Search Report for Application # PCT/EP2007/053563 Dated Nov. 27, 2007.

* cited by examiner

*Primary Examiner* — Walter Griffin
*Assistant Examiner* — Huy-Tram Nguyen
(74) *Attorney, Agent, or Firm* — Eschweiler & Associates, LLC

(57) ABSTRACT

The invention relates to an amalgam decomposer for mercury cathode chlor-alkali cells. The amalgam decomposer of the invention contains a filling of carbon steel rings whose external surface is provided with a catalytic coating for amalgam decomposition consisting of one or more electrically conductive metals carbides. The internal surface of the rings is free of catalytic coating and wettable by the amalgam, while the external carbide catalytic coating is not wettable by the amalgam thereby favoring hydrogen evolution.

13 Claims, 3 Drawing Sheets

AMALGAM DECOMPOSER FOR MERCURY CATHODE CELLS FOR ALKALI CHLORIDE ELECTROLYSIS

CROSS-REFERENCE TO RELATED APPLICATION

Figure 1:
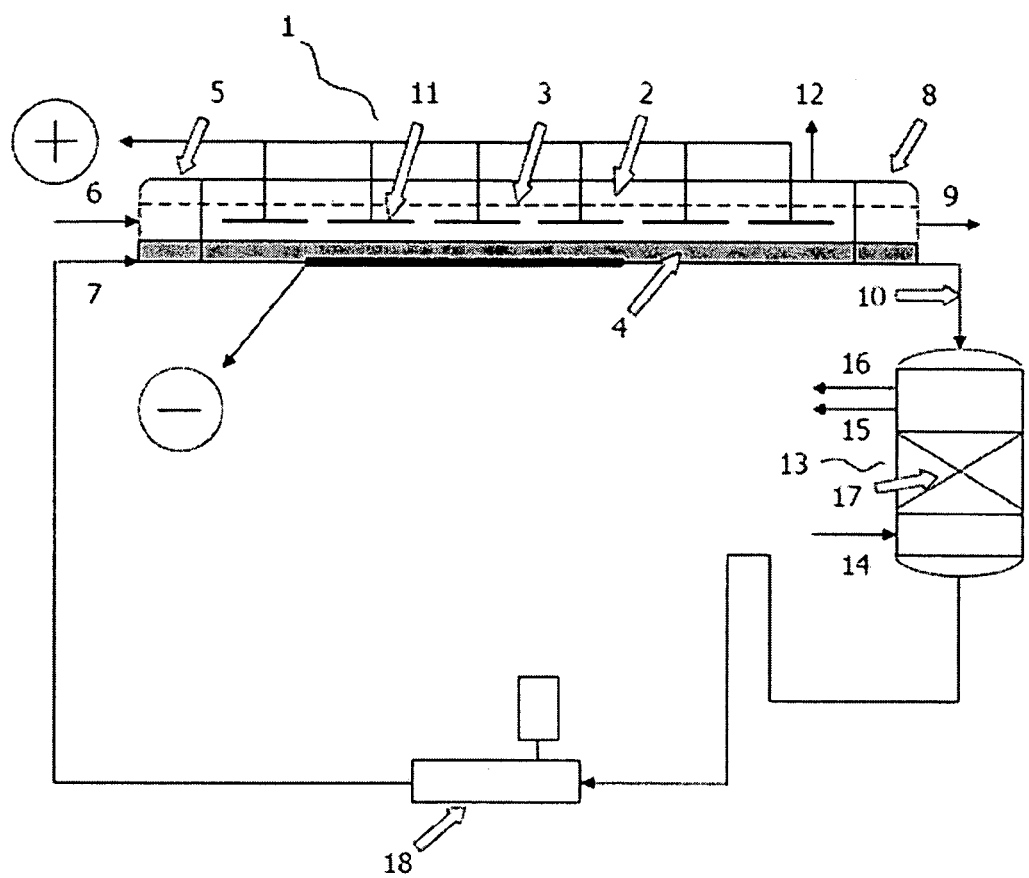

This application is a continuation of PCT/EP2007/053563 filed Apr. 12, 2007, that claims the benefit of the priority date of Italian Patent Application No. MI2006A000731 filed Apr. 12, 2006, the contents of which are herein incorporated by reference in their entirety.

BACKGROUND

The production of chlorine by electrolysis of alkali chloride solutions is currently carried out by means of three different processes, namely the ion-exchange membrane process, the porous diaphragm process and the mercury cathode process. In the following, reference will be made, for the sake of simplicity of description, to the electrolysis of sodium chloride solutions. Nevertheless, the invention equally applies to the electrolysis of other alkali chlorides, such as lithium or potassium chloride. The mercury cathode-type electrolysis of sodium chloride solutions (hereinafter "brine"), based on a long-known technology, has experienced a continuous improvement in the cell structure (Ullmann's Encyclopaedia of Industrial Chemistry, VCH, Vol. A6, pag. 416) essentially directed to the decrease in the electric energy consumption and to the abatement of mercury emissions to the environment.

The problem of energy consumption reduction was accomplished with success by replacing the original graphite anodes with titanium anodes provided with a catalytic coating based on oxides of platinum group metals, particularly effective for chlorine evolution. The activated titanium anodes are also characterised by a long operative lifetime which allowed a substantial reduction in the amount of cell shut-downs which are quite frequent in the case of the corrodible graphite anodes. Since maintenance shut-downs are critical for mercury emissions, the benefit obtained from this standpoint is apparent.

A further reduction in mercury leaks was further allowed by modifications in the cell design, as disclosed in the co-pending Italian patent application MI2006A000309, and by the routine use of recrystallised salt, which permits minimising the quantity of mercury-polluted muds purged from the brine purification section, although at a higher cost.

As a consequence of these provisions it can be now be demonstrated that the release of mercury from a well-designed and correctly handled plant amounts to no more than 3 grammes per tonne of product chlorine versus a value of 10 grammes of about ten years ago (Ullmann's Encyclopaedia of Industrial Chemistry, VCH, Vol. A6, page 424).

In currently operating plants, the sodium amalgam is fed to the upper portion of an amalgam decomposer shaped as a generally vertical vessel containing a filling of graphite fragments activated with a catalyst, for instance molybdenum oxide. The amalgam flowing down the interstices between the graphite particles meets a countercurrent deionised water flow fed to the lower portion of the amalgam decomposer. The catalytic action of graphite allows the amalgam decomposition reaction to proceed at an acceptable rate, with formation of caustic soda, which together with chlorine is the product of commercial interest, according to the following scheme:

$$Na(Hg)_x + H_2O \rightarrow NaOH + \tfrac{1}{2}H_2$$

In reality, the mechanism accounting for the overall reaction is remarkably more complex as it involves the amalgam droplet—graphite particle couples statistically generated in time. Each of these couples actually operates as a short-circuited micro-battery, wherein the amalgam droplet and the graphite particle respectively act as anodic and cathodic areas according to the following partial reactions, whose combination gives the above indicated overall reaction:

amalgam droplet(anodic area): $Na(Hg)_x \rightarrow Na^+ + xHg + e$ graphite particle(cathodic area): $H_2O + e \rightarrow \tfrac{1}{2}H_2 + OH^-$ To obtain a high amalgam decomposition rate, it is necessary that the hydrogen evolution partial reaction, which is the bottleneck of the overall kinetics, be adequately promoted. For this reason, graphite, which has a moderate activity, is further added with more catalytic materials, such as molybdenum oxide, which is deposited by imbibition of an ammonium molybdate solution followed by a suitable thermal treatment. The so treated graphite is not wettable by the amalgam. Such feature has the advantage of impeding the formation of an adherent amalgam superficial film that would prevent the required contact with water which is the first step of the hydrogen evolution reaction.

On the other hand, this has also a negative effect, because the lack of wettability entails a high electrical contact resistance between graphite particle and amalgam droplet, in its turn strongly hindering the flow of electrons generated by sodium ionisation on the amalgam droplet and that must reach the graphite particle to adequately sustain hydrogen evolution. Hence it is shown that graphite cannot be an optimal catalyst, and this also applies for other homogeneous type formulations, such as the one disclosed in U.S. Pat. No. 4,161,433 wherein decomposition catalysts consisting of metal borides and carbides are proposed. From an ideal standpoint in fact any single particle of catalytic material should comprise one or more pairs of separate anodic and cathodic microscopic areas, the anodic ones being wettable by the amalgam and the cathodic ones being non wettable and in intimate contact with the water flow. It would be further necessary to minimise the electrical resistance between the two types of area to provide the lesser hindrance to the electrons flowing from the anodic areas, where they are released by sodium ionisation, to the cathodic areas where they are consumed in the hydrogen evolution reaction.

Besides the above mentioned inconveniences, the graphite particles undergo some grinding under the erosive action of the evolved hydrogen: as a first consequence, the filling undergoes a volume contraction in time that, once a value of about 20% is reached, leads to an intolerable productive capacity loss forcing the operators to discontinue the operation and to proceed with loading fresh catalyst.

From the above discussion it will be clear that the use of activated graphite represents a far from satisfying solution.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, the invention comprises a novel filling for amalgam decomposers operating in association with mercury cathode-type alkali chloride electrolysis cells.

To the accomplishment of the foregoing and related ends, the following description and drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

BRIEF DESCRIPTION OF THE DRAWING FIGURES

Figure 2:
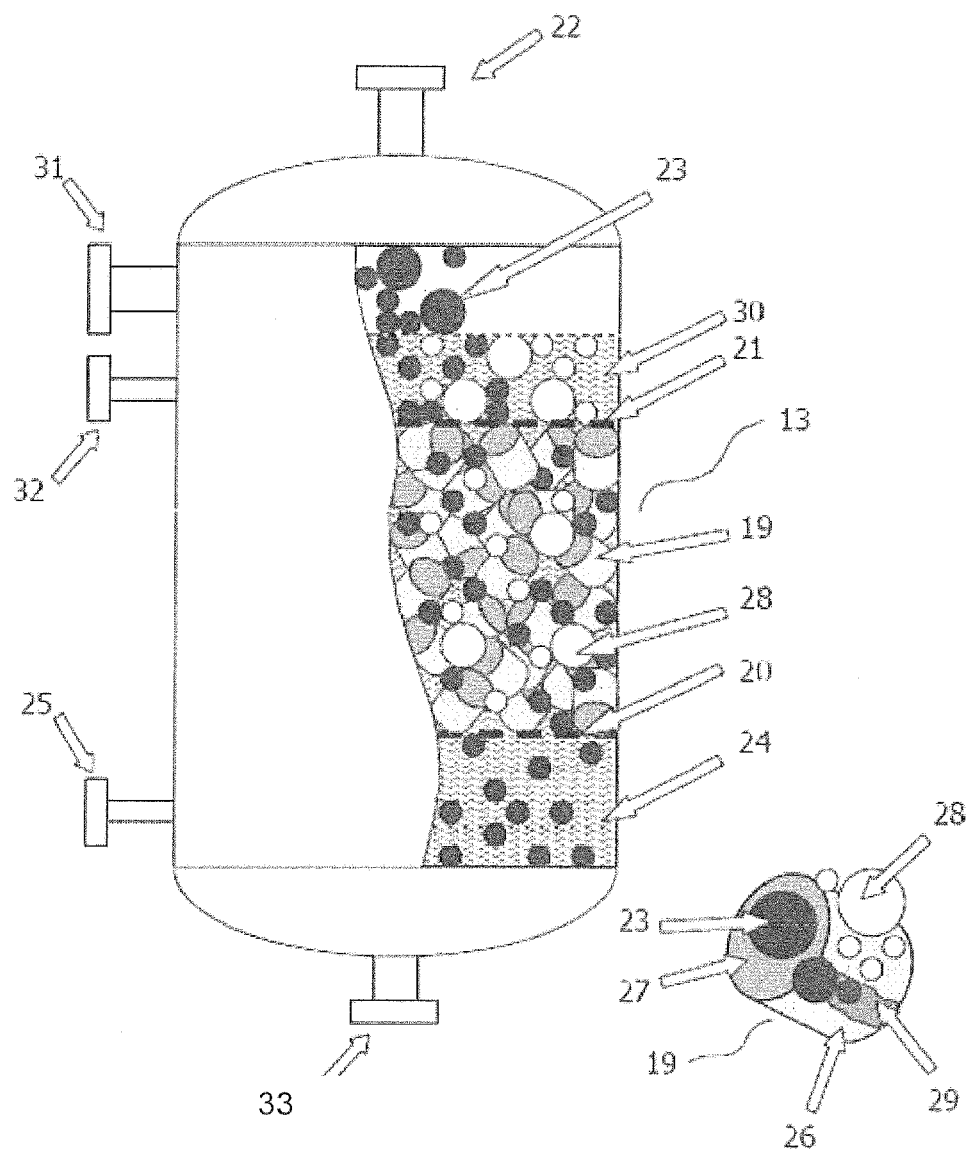
Figure 3:
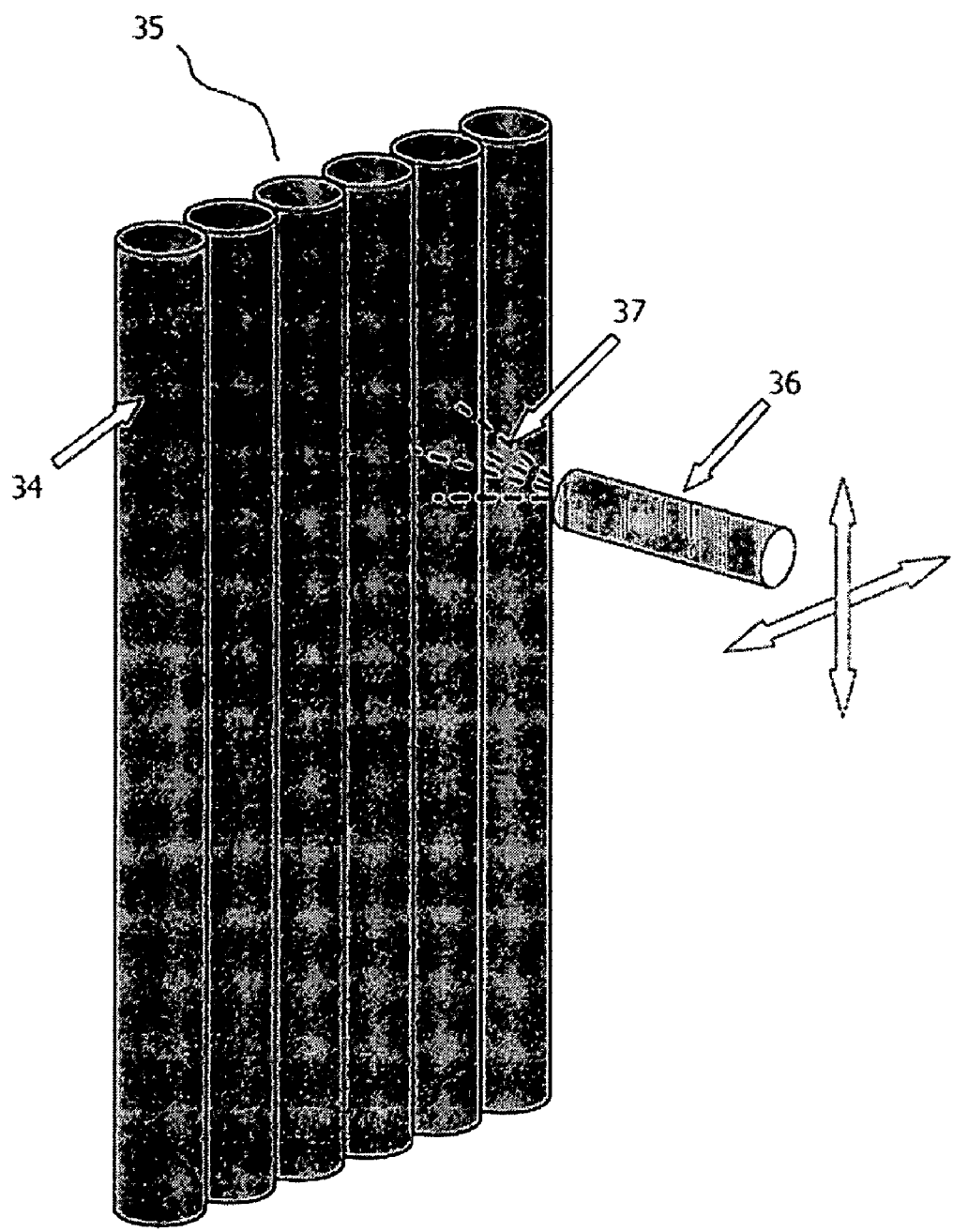

The invention will be described hereafter making reference to the following explicative drawings:

FIG. 1 illustrates a device for electrolysis of alkali chloride solutions comprising a mercury cathode cell, an amalgam decomposer according to an embodiment of the invention and the disamalgamated mercury recycle pump FIG. 2 illustrates the amalgam decomposer of FIG. 1 with a partial internal side-view of the filling consisting of catalytically coated cylindrical rings, with a detail showing the structure of a preferred ring embodiment FIG. 3 illustrates an assembly of tubes arranged in a planar compact structure during the spraying of catalytic coating on a major surface thereof.

DESCRIPTION

Under a first aspect, the invention relates to a catalyst comprising amalgam-wettable metallic elements, whose surface is partially provided with a non-wettable catalytic coating, usable as filler for amalgam decomposers.

The elements of the invention are preferably cylindrical rings and the relevant surface partially or completely provided with a non-wettable catalytic coating is the external surface.

The amalgam-wettable metal may comprise one or more of iron, nickel, carbon steel, or stainless steel. However, one skilled in the art will also be capable of selecting additional metallic materials with suitable characteristics. According to one embodiment of the invention, the catalytic coating includes metal carbides comprising of one or more of titanium, zirconium, niobium, tantalum, tungsten.

The application of the catalytic coating to the surface of the metallic elements may be carried out by spraying techniques, such as flame or plasma-spraying of powders. The externally coated rings may be manufactured, for example, by applying the coating through micronised powder spraying on tubes and subsequently sectioning the tubes into rings.

The rings having an external surface partially provided with a catalytic coating may also be manufactured by assembling a multiplicity of tubes in a planar compact structure, applying the catalytic coating by micronised powder spraying on the two major surfaces of the structure and subsequently cutting the structure into rings wherein two lateral stripes of the external surface remain free of catalytic coating.

The sketch of FIG. 1 represents a longitudinal section of a mercury cathode electrolysis cell with the relevant amalgam decomposer, wherein 1 identifies the cell as a whole, 2 the cell body with the level 3 of brine and with the film 4 of mercury flowing on the carbon steel bottom, 5 the inlet end-box with the outlets 6 and 7 respectively for brine and disamalgamated mercury, 8 the inlet end-box with the outlets 9 and 10 respectively for the depleted brine and for the amalgam generated in the cell, 11 the anodes consisting of a planar structure of titanium rods coated with a catalytic coating for chlorine evolution based on platinum group metal oxides as known in the art, 12 the product chlorine outlet, 13 the amalgam decomposer provided with inlets for the amalgam coming from outlet 10 and for demineralised water 14, and with outlets for caustic soda 15 and hydrogen 16. The anodes and the carbon steel bottom are connected respectively to the positive and to the negative pole of a rectifier (not shown in the figure).

Brine is partially converted to chlorine on the anodes and to sodium amalgam on the mercury mobile film. The depleted brine exiting from 9 is delivered to the dechlorination, resaturation and purification units. The chlorine withdrawn through nozzle 12 is cooled down, dried and pressurised before the direct appliance in user plants or before being liquefied and commercialised. The amalgam produced in cell 1 is decomposed in the amalgam decomposer 13 where it is put in contact with demineralised water in the catalytic filling 17. The reaction produces concentrated caustic soda, hydrogen and mercury which is recycled to the cell at 7. In the prior art technique the filling 17 consists of graphite particles activated with metal oxides, for instance molybdenum oxide. The conversion of the amalgam to caustic soda and hydrogen must be as complete as possible so that mercury recycled to the cell by pump 18 contains only minimum residual quantities of sodium. Due to the poor catalytic capacity of activated graphite, such a result is only obtained by over-sizing the amalgam decomposer. For instance, with cells of average capacity operated with currents of about 200 kA the amalgam decomposer is a cylindrical vessel of about 1100 mm diameter and overall height of 2100 mm, whereof about 1200 mm are occupied by the filling.

The inventors have surprisingly found that the inconveniences of the prior art, consisting of the poor catalytic activity of graphite, the consequent over-sizing of the amalgam decomposer and the insufficient operative lifetime, may be overcome by the introduction of fillings comprising a multiplicity of amalgam-wettable metal elements characterised by having their surface partially coated with a catalytic non amalgam-wettable coating for hydrogen evolution.

The term elements is herein intended to mean portions of metal of various geometrical shapes, dimensioned in order to provide, once stacked to form the filling, an extended contact surface for the reaction between amalgam and water. This object is common to many chemical processes, such as, for example, the gas absorption in liquid phases or conversely the gas stripping from liquid phases. For such processes, very effective fillings were developed, comprising a stack of single elements, for instance in the form of cylindrical rings, cylindrical semi-rings or Raschig rings. The inventors have verified that all of these elements may be advantageously selected for the filling 17. It was found that suitable filling, not only in terms of amalgam decomposition efficiency but also of cost and facility of coating application, comprises cylindrical rings with an internal diameter of 10-40 mm, thickness of about 1 mm and length comprised between 10 and 40 mm.

FIG. 2 shows a more detailed sketch of the amalgam decomposer 13 according to an embodiment of the invention, wherein filling 17 is formed by a stack of cylindrical rings 19 supported by a grid 20. The filling further comprises an element for homogenising the amalgam feed, for instance comprising a perforated plate 21 also contributing to maintain the rings in position preventing harmful vibrations which could be caused by the evolution of hydrogen. The amalgam, entering from nozzle 22, flows in the form of droplets 23 through cylindrical rings 19 in continuous contact with the surfaces thereof. A flow of demineralised water 24 flows countercurrently towards the upper part of the amalgam decomposer, fed through nozzle 25. The water reacts with the amalgam by aid of the catalytic action of rings 19. The structure of a ring embodiment is shown in detail also in FIG. 2. The ring 19 has an external surface partially provided with a catalytic coating 26 and an internal surface free of coating 27. The metal of the rings 19 is wettable by the amalgam and comprises one or more of pure iron, carbon steels with a carbon content below 0.1%, nickel and cobalt. The wettability reduces the electrical contact resistance between the amalgam droplets 23 and the internal surface and optionally the uncoated portion of the external surface of the rings. The coating 26 applied to the external surface is conversely non-wettable, a feature preventing the adhesion of the amalgam droplets, thereby ensuring an easy access of water to the catalytic surface. The overall reaction, as mentioned, involves the ionisation of sodium released in the aqueous phase in form of $Na^+$ by the amalgam droplets 23 and the passage of electrons across the metal up to the catalyst-coated surface 26 where they participate to the evolution of hydrogen bubbles 28. In one ring embodiment in the detail of FIG. 2, the external surface is coated only in part with the catalyst. For instance, stripe 29 presents an uncoated metallic surface facing an equivalent surface 27 in order to increase the possibility of contact with the amalgam droplets. The product hydrogen rises to the upper part of the amalgam decomposer and exits nozzle 31 after separating from the caustic soda 30 discharged at 32. Mercury, which contains only minor traces of residual sodium, is sucked in at 33 by the recycle pump 18 to be sent back to the cell.

The catalytic coating according to the invention may comprise a variety of components, provided they are, as previously mentioned, sufficiently active towards hydrogen evolution and not wettable by the amalgam. It was found that such requirements are satisfied at reasonable costs by metal carbides of significant electrical conductivity comprising one or more of titanium, zirconium, niobium, tantalum, tungsten and silicon carbides. The method for their application to the filling elements is the flame or plasma spraying of micronised powders easily available in sizes comprised between 10 and 100 µm at reasonable costs due to their widespread use as anti-wear coatings in the metallurgical industry. In particular, details regarding the plasma technology, preferred for the evenness and adherence of the deposited coatings, are disclosed in the brochure "Plasma spray technology, fundamentals and applications, 1975" edited by the Plasma-Technik AG Company, Germany. According to the indications of the brochure, the plasma is obtainable with a mixture of hydrogen and nitrogen in a ratio comprised for example between 70:30 and 95:5, fed at a flow-rate of 5-20 l/min. The powder carrier gas is nitrogen. The application is carried out at a current of 200-600 A and a voltage of 50-90 V. The distance between the device 36 and the object to be coated is set between 120 and 300 millimeters.

When the elements of the filling are cylindrical rings, the coating application is carried out on tubes of suitable diameter, for example, made of carbon steel, which are rotated in front of the spraying apparatus until obtaining a predetermined thickness of catalytic material. Once the application step is completed, the coated tubes are cut into equal portions, thereby obtaining cylindrical rings in accordance with the invention by having the external and the internal surface respectively coated and uncoated.

The cylindrical ring shape of FIG. 2 is obtainable making use of the procedure summarised in FIG. 3. Carbon steel tubes of suitable diameter 34 are assembled side by side to form a substantially planar structure 35. A flame or plasma spraying device 36, horizontally and vertically movable parallel to the major plane of the structure 35, is placed in front of the latter. The automated displacement of device 36 permits applying the catalytic coating on tubes 34 in the form of sprayed material 37. When the application is carried out on a single face of structure 35, the cutting gives rise to rings presenting about 50% of the external surface and the whole of the internal surface free of catalytic coating. In any case it was found that the best results are obtained with the type of ring shown in FIG. 3 obtained by cutting the tubes after carrying out the application of the catalytic coating on both faces of structure 35. In this case, the uncoated portion corresponds to the whole internal surface of the ring and two lateral external stripes 29 corresponding to the zones of structure 35 inaccessible to the sprayed material 37 due to the contact between adjacent pairs of tubes. This type of cylindrical ring proved optimal for amalgam decomposition probably due to the closeness between amalgam droplets in contact with stripes 29 and catalytically coated surface 26.

EXAMPLE 1

Assemblies of 50 pieces of Fe 410.2-type carbon steel tube having a length of 1 meter, an internal diameter of 20 mm and a thickness of 1 mm, arranged in mutual contact with one another to form a planar structure of the type indicated as 35 in FIG. 3 with an overall size of 1 m×1 m, were subjected to the application of a catalytic coating comprising titanium carbide. The tubes were previously sandblasted with grit iron until obtaining a surface roughness of 30-40 µm, then plunged in 20% hydrochloric acid for about 10 minutes. The coating application was carried out by means of a Plasmatechnik plasma apparatus using AMPERIT® 570.3 powder provided by H. C. Starck. The source gas for plasma was a mixture of helium at 1.3 l/min flow-rate and nitrogen at 2.5 l/min flow-rate. The carrier gas for the titanium carbide powder was nitrogen at 6.5 l/min flow-rate.

The current was set at about 560 A, the voltage at 62 V, the translation rate of the spraying device 36 at about 12 m/min and the gap between spraying device and structure at 35÷150 mm.

The application was terminated after the deposition of 50-80 $g/m^2$ titanium carbide. The coated tubes were then cut into rings of 2 cm length obtaining a total of 125,000 pieces of the preferred type illustrated in the detail of FIG. 2.

The rings were then loaded in the decomposer of a 200 kA industrial cell of 1000 mm diameter, with a 1200 mm filling height for a total of 90,000 rings and an overall height of 2100 mm.

The cell-amalgam decomposer system was then started with the following main operative parameters detected after a few hours in stable conditions:

current 200 kA
cell voltage 4.2 V
mercury flow-rate 4.2 $m^3$/h
sodium concentration in the amalgam at cell outlet 0.3%
sodium concentration at amalgam decomposer outlet 0.004%
caustic soda concentration at amalgam decomposer outlet 49.8% a 110° C.

The functioning was protracted for about 6000 additional hours without noticing any significant variation. After this run the cell was stopped and the amalgam decomposer was opened and inspected without detecting any problem. In particular, the filling height was substantially the same measured at the start up. Part of the rings were taken away reducing the filling height to just 830 mm. In these new operative conditions the cell was restarted and the operative data were again collected. It was noticed that the functioning of the amalgam decomposer was unchanged, replicating in particular the values of inlet and outlet sodium concentration in the amalgam and of caustic soda concentration previously obtained with the 1200 mm high filling. Furthermore the functioning conditions remained stable for an additional 5700 hours.

This second experimental phase demonstrates the high efficiency of the filling comprising a stack of rings provided with amalgam-wettable surfaces and catalyst-coated non-wettable surfaces, wherein such surfaces are macroscopically separated. Such a conclusion is demonstrated by the capacity of maintaining a perfectly regular functioning even when the filling was reduced by about 30%, a condition which in the case of a prior art graphite filling would lead to a residual sodium concentration in the mercury at the outlet of the amalgam decomposer of about 0.1%, totally unacceptable for a regular electrolytic operation.

Although the disclosure has been shown and described with respect to one or more embodiments and/or implementations, equivalent alterations and/or modifications will occur to others skilled in the art based upon a reading and understanding of this specification. The disclosure is intended to include all such modifications and alterations and is limited only by the scope of the following claims. In addition, while a particular feature may have been disclosed with respect to only one of several embodiments and/or implementations, such feature may be combined with one or more other features of the other embodiments and/or implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. An amalgam decomposer for mercury cathode-type electrolytic cells, comprising, a vertical vessel provided with an internal catalytic filling for decomposing the amalgam generated inside the cell with water, the filling comprising a multiplicity of amalgam-wettable metallic elements whose surface is partially uncoated and partially provided with a catalytic coating, the catalytic coating being non-wettable by the amalgam.

2. The amalgam decomposer of claim 1, the amalgam-wettable metal comprises one or more of pure iron, carbon steel, nickel and cobalt.

3. The amalgam decomposer of claim 2, the carbon steel having a carbon content lower than 0.1%.

4. The amalgam decomposer of claim 1, the catalytic coating comprising at least one metal carbide.

5. The amalgam decomposer of claim 4, the at least one metal carbide being electrically conductive.

6. The amalgam decomposer of claim 4, the at least one metal carbide comprising one or more of titanium, zirconium, niobium, tantalum, tungsten and silicon carbides.

7. The amalgam decomposer of claim 1, the multiplicity of elements comprising cylindrical rings, cylindrical semi-rings or Raschig rings.

8. The amalgam decomposer of claim 7, the cylindrical rings having an uncoated internal surface and an external surface provided at least partially with a catalytic coating.

9. The amalgam decomposer of claim 8, the external surface comprising two uncoated lateral stripes.

10. The amalgam decomposer of claim 7, the cylindrical rings having diameter and length independently comprising between 10 and 40 millimeters.

11. A process for the manufacturing of the multiplicity of elements of claim 1, comprising applying the catalytic coating to part of the surface of the elements by flame or plasma spraying of powders.

12. The process of claim 11, the application step of the catalytic coating by spraying carried out on the external surface of tubes subsequently cut into a multiplicity of rings.

13. The process of claim 11, the application step of the catalytic coating by spraying carried out on at least one external surface of a planar compact structure consisting of an assembly of tubes, the planar structure being subsequently cut into a multiplicity of rings.

* * * * *